Oct. 18, 1927.
M. C. MEYERS
WATER FILTER
Filed Nov. 15, 1926
1,645,712
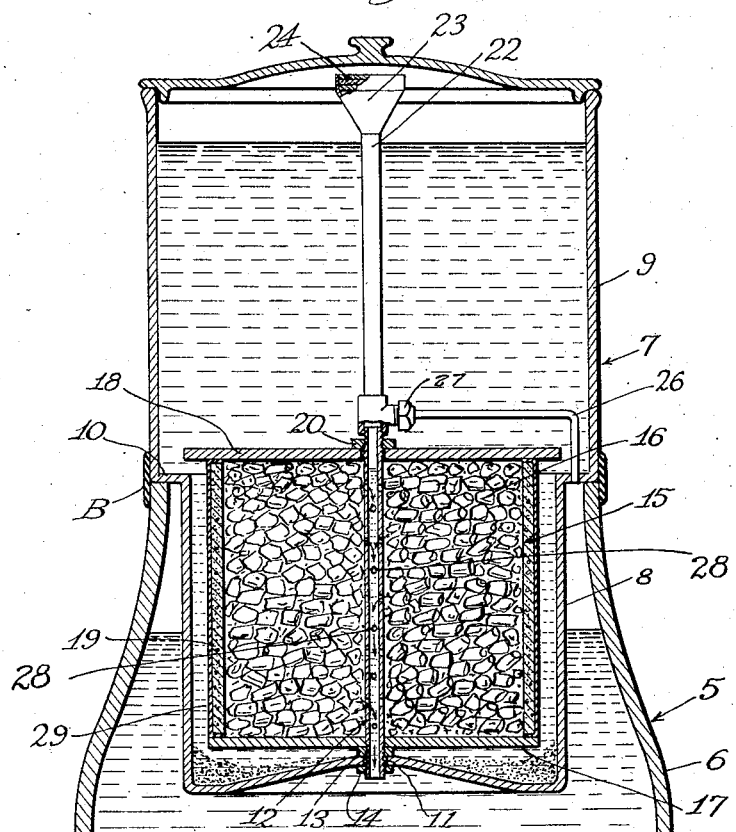
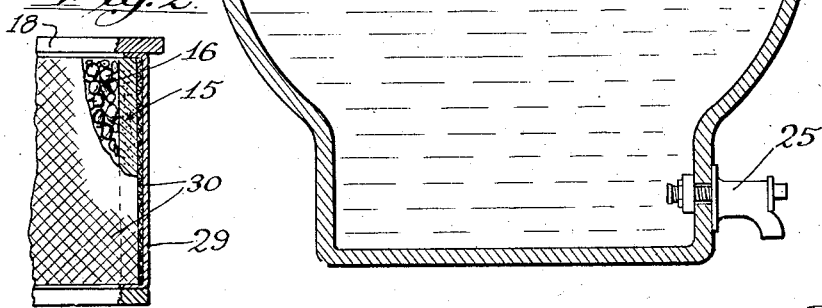
Inventor
MEARL C. MEYERS.
Attorney Patented Oct. 18, 1927.

1,645,712

UNITED STATES PATENT OFFICE.

MEARL C. MEYERS, OF LOS ANGELES, CALIFORNIA.

WATER FILTER.

Application filed November 15, 1926. Serial No. 148,331.

This invention relates to portable water filters adapted for home and office use.

A main object of the invention is to provide a portable filter in which the filter element is disposed within the water receptacle in such manner as to be readily removed therefrom for renewal of the filtering material.

A further object is the provision of a sealed receptacle for the filtered water having a vent leading therefrom to the water receptacle, whereby to expel the air from the filtered water chamber as the same becomes filled.

A further object is to provide a removable filtering means surrounding the porous wall of the filter chamber for collecting the major portion of foreign matter contained in the water before it enters the filtering chamber.

It is still a further object to provide an air vent means from the filtered water chamber adapted to prevent the formation of a partial vacuum when water is withdrawn therefrom.

Another object is to provide a water filtering member for the wall of the filter chamber, which may be readily and quickly removed for cleansing or renewal purposes.

Other objects and advantages will be apparent from the following specification, when taken in connection with the annexed drawings, in which:

Fig. 1 is a central vertical section through the filter.

Fig. 2 is a detail view of a modified form of filter chamber.

The filter 5, preferably consists of two substantially cylindrical members preferably formed of stone ware disposed one above the other, the lower member 6 constituting a chamber for the filtered water while the upper member 7 is designed to hold the water for filtration.

The upper filter member 7 preferably consists of a lower portion 8 of a diameter less than its upper portion 9 in order that an annular flange 10 may be formed therebetween for supporting the upper member 7 on the circular open end of the lower member. The bottom wall of the lower portion 9 of the water member is concaved on its outer surface and is provided with an aperture 11 for the passage therethrough of the lower end of a vertically disposed metal water discharge pipe 12, its lower exterior end being threaded for the reception of nuts 13, 14, for maintaining the pipe in fluid tight relation to the bottom wall.

Concentrically mounted on the discharge pipe 12 is a cylindrical member 15 adapted to form a chamber for the reception of a filtering material 16, such as charcoal. The bottom wall 17 is formed of glazed pottery material as is the upper closure wall 18, and the cylindrical wall 19 is formed of a porous filtering material, such as unglazed clay. The cylindrical wall 19 is supported on the bottom wall 17, and both walls are provided with centrally disposed holes for the passage therethrough of the metal water discharge pipe 12, a nut 20 engaging the upper exteriorly threaded end of the pipe 12 serves to hold the filter member 15 in rigid engagement with the pipe.

In screw threaded engagement with the upper end of pipe 12, is a stand pipe 22 terminating at its upper end in a funnel shaped end 23 in which is disposed a porous packing 24 designed to filter the air that is drawn downwardly through the pipe when water is withdrawn from the filtered water chamber through the outlet valve 25.

In order that the air in the filtered water chamber may be forced outwardly therefrom as the chamber becomes filled a vent pipe 26 is provided. This pipe passes through an opening in the flange 10, and its upper end is connected by means of a nut 27 to a T-fitting secured to the lower end of the stand pipe 22, the air passing upwardly through said pipe and is discharged into the upper chamber or member 7 of the filter. That portion of the water discharge pipe 12 that is disposed within the filter member 15 is provided with a plurality of perforations 28 through which the filtered water passes downwardly through the pipe into the filtered water chamber or receptacle.

In order to collect the coarser foreign matter contained in the unfiltered water prior to its entrance into the filter chamber, I have provided the exterior surface of the cylindrical wall with a covering of porous filtering material 29 such as asbestos. By means of this wrapping the porous cylindrical wall of the filter chamber is maintained in a comparatively clean condition, and when the wrapping becomes clogged it may be quickly removed for cleansing or renewal, the wrapping being held in position by inturned upper and lower ends that are engaged in clamped relation by the upper and lower circular walls of the filter chamber.

In Fig. 2 is illustrated a modified form of wrapping for the wall of the filter chamber. In this form a screen 30 is first mounted around the exterior surface of the filter wall, and the filter wrapping 29 mounted thereon. By means of this construction a chamber is formed between the inner surface of the asbestos wrapping and the exterior surface of the filter wall permitting of a greater area of filtration surface. When this medium becomes clogged the same with the wire netting may be quickly removed and renewed or cleansed by the application of heat.

The lower portion of the lower portion 8 of the filter member 7 directly below the lower or bottom wall of the filter chamber is designed to collect the dirt and foreign matter settlings of the unfiltered water, and in order to seal the joint between the upper and lower filter members an elastic band —B— is provided.

By providing an air inlet leading into the filtering chamber 15, the charcoal may be completely aerated or returned to its original condition, the aeration being accomplished by withdrawing the unfiltered water from the upper filter chamber.

What I claim is:

1. A water filter comprising two non-porous receptacles disposed one above another, the lower receptacle having a valved outlet leading therefrom, a third closed receptacle for the reception of a filtering material mounted within the upper receptacle and out of contact with its walls, the vertical wall of said receptacle being formed of a porous material, a covering of filtering material surrounding said receptacle, a perforated water discharge pipe leading from the third receptacle and discharging into the lower receptacle, an air pipe connected to the upper end of said perforated pipe, the upper end of said pipe terminating adjacent the upper end of the upper receptacle, and an air vent pipe connecting the lower receptacle with the air pipe, whereby to permit an escape of air from the lower receptacle as the same becomes filled with water.

2. A water filter comprising two non-porous fluid receptacles disposed one above another, the lower receptacle being provided with a valved outlet leading therefrom, a receptacle for a filtering material mounted in the upper receptacle out of contact with its walls, the vertical wall of said receptacle being formed of a porous material, said container having a fluid outlet leading to the lower receptacle, and a removable filtering medium secured to the outer surface of the vertical wall of the receptacle.

3. A water filter comprising a non-porous receptacle for filtered water having a valve outlet leading therefrom, a non-porous receptacle for unfiltered water mounted on the upper end of said first named receptacle, the lower portion of said receptacle extending within the upper portion of first named receptacle, a cylindrical receptacle for the reception of a filtering material mounted within the lower portion of the second named receptacle, the cylindrical wall ot said closed receptacle being imperforate but formed of porous material, the walls of said receptacle being out of contact with the wall of the second named receptacle, the upper and lower walls of the receptacle for the filtering material being formed of a non-porous material, a covering of filtering material surrounding said filtering receptacle, and a perforated discharge pipe leading from the interior of said filtering receptacle and discharging into the first named receptacle.

In witness that I claim the foregoing I have hereunto subscribed my name this 26th day of October, 1926.

MEARL C. MEYERS.